US012752940B1

(12) United States Patent
Felemban et al.

(10) Patent No.: US 12,752,940 B1
(45) Date of Patent: Oct. 6, 2026

(54) BI-STABLE SPRING MECHANISM FOR DRONE LATCHING AND INSPECTION OF ROUND SURFACES

(71) Applicant: Saudi Arabian Oil Company, Dhahran (SA)

(72) Inventors: Amjad Felemban, Thuwal (SA); Yousef Damanhouri, Thuwal (SA); Ibrahim S. Alsalamah, Thuwal (SA); Fadl Abdellatif, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 19/198,544

(22) Filed: May 5, 2025

(51) Int. Cl.
*B64U 20/80* (2023.01)
*B64U 101/26* (2023.01)

(52) U.S. Cl.
CPC .......... *B64U 20/80* (2023.01); *B64U 2101/26* (2023.01)

(58) Field of Classification Search
CPC .................................................. B64U 2101/26
See application file for complete search history.

(56) References Cited

U.S. PATENT DOCUMENTS 10,697,935 B2 6/2020 Amer et al.
10,787,259 B2 * 9/2020 Zhang ...................... B64D 1/22
11,235,823 B2 2/2022 Abdelkader et al.
11,584,516 B2 * 2/2023 Abdellatif .............. B64U 70/99
2020/0148360 A1 * 5/2020 Zhang ...................... B64D 1/22
2022/0169368 A1 * 6/2022 Abdellatif ............... B64C 25/32
2024/0239528 A1 * 7/2024 Forman .................. B64U 10/13
2024/0351370 A1 * 10/2024 Spiegel .................... B25J 5/007
2025/0187760 A1 * 6/2025 Tao ........................ B64U 30/20

FOREIGN PATENT DOCUMENTS

CN 115319784 A * 11/2022 ............. B25J 15/02

OTHER PUBLICATIONS

Jitosho et al. "Exploiting bistability for high force density reflexive gripping." 2019 Int Conf Robot Auto (ICRA). May 20-24, 2019. 7 pages.
Zheng et al. "Metamorphic aerial robot capable of mid-air shape morphing for rapid perching." Sci Rep. 2023;13 (1):1297. 14 pages.

* cited by examiner

*Primary Examiner* — Philip J Bonzell
(74) *Attorney, Agent, or Firm* — Leason Ellis LLP

(57) ABSTRACT

An apparatus for facilitating attachment of a drone to a curved surface of an object of interest comprises a bi-stable spring surface latch having two semi-stable states including a coiled state in which the bi-stable spring surface is able to conform to the curved surface and an uncoiled state, the bi-stable spring surface including sensor modules on an inner side that attach to the curved surface, a fixture coupled on one side to the drone and on another side to the bi-stable spring surface and a motor coupled to the fixture and also coupled to the bi-stable spring surface via threads or cables, the motor being operative to apply tension to the bi-stable spring surface so as to induce a change in a state of the bi-stable spring surface which causes the bi-stable spring surface to either couple to or uncouple from the curved surface.

14 Claims, 7 Drawing Sheets

BI-STABLE SPRING MECHANISM FOR DRONE LATCHING AND INSPECTION OF ROUND SURFACES

FIELD OF THE INVENTION

The present invention relates to unmanned aerial vehicles and drones, and more particularly relates to a bi-stable spring mechanism for drone latching and inspection of round surfaces.

BACKGROUND OF THE INVENTION

The inspection and maintenance of exposed metallic assets, such as pipes, storage tanks, and the like, can be difficult or impractical to perform by humans in some environments. In such circumstances, the use of automated unmanned aerial vehicles (UAVs) may provide a workable alternative. However, such inspection and maintenance is often best performed when the UAV is in direct and secure contact with the asset, rather than hovering at a distance from the asset. Such direct contact can be challenging to achieve because UAVs can be difficult to land, perch, and maneuver on the asset. Further, pipes (and other curved surface structures) can be especially challenging to inspect or maintain with a UAV, as these assets present curved surfaces with which to land, perch, or maneuver.

A number of different innovations have been made toward meeting these challenges. For example, commonly-owned and assigned U.S. Pat. No. 10,697,935 (entitled "Two-stage corrosion under insulation detection methodology and modular vehicle with dual locomotion sensory systems") describes a UAV inspection device that includes aerial and ground locomotive capabilities. The UAV of the '935 patent can be to a location on the equipment to be inspected and can subsequently travel along the surface to other inspection locations. Embodiments of the UAV include a passive clamping (perching) mechanism that is configured to selectively attach the UAV to the surface of the equipment and to maintain its attachment to the equipment while the UAV travels along the surface of the equipment.

In another example, commonly-owned and assigned U.S. Pat. No. 11,235,823 (entitled "Automation methods for UAV perching on pipes") discloses a perching UAV that includes a releasable crawler for inspecting or maintaining a structure, such as a difficult-to-access pipe or storage tank. The UAV of the '823 patent has advanced capabilities to perform contact inspection jobs on ferromagnetic surfaces such as carbon steel pipes and structures. The UAV can fly towards a pipe to be inspected, land on it autonomously (commonly referred to as perching), and deploy a releasable crawler to crawl around the pipe to perform, for example, elaborate inspection jobs.

Even with such innovations, it has been found that maintaining the contact of a UAV to a curved surfaces can still be challenging. What is therefore needed are more robust ways of providing and ensuring the direct contact of UAVs to curved surfaces.

SUMMARY OF THE INVENTION

The present disclosure describes an apparatus for facilitating attachment of an unmanned aerial vehicle (UAV) ("drone") to a curved surface of an object of interest. The apparatus comprises a bi-stable spring surface latch ("bi-stable spring surface") having two semi-stable states including a coiled state in which the bi-stable spring surface is able to conform to the curved surface and an uncoiled state, the bi-stable spring surface including sensor modules on an inner side that attaches to the curved surface. The apparatus also includes a fixture coupled on one side to the drone and on another side to the bi-stable spring surface and a motor coupled to the fixture and also coupled to the bi-stable spring surface via threads or cables, the motor being operative to apply tension to the bi-stable spring surface so as to induce a change in a state of the bi-stable spring surface which causes the bi-stable spring surface to either couple to or uncouple from the curved surface.

In another aspect, the present disclosure describes a method of inspecting a curved surface of an object of interest. The method comprises releasably coupling a bi-stable spring surface onto a location of the curved surface of the object of interest, wherein the bi-stable spring surface has a semi-stable state in which it is in a coiled state without external forcing, and application of the bi-stable spring surface causes the bi-stable spring surface to coil around the surface of the object of interest, and measuring features on the curved surface using sensor modules positioned on an inner surface of the bi-stable spring surface.

These and other aspects, features, and advantages can be appreciated from the following description of certain embodiments of the invention and the accompanying drawing figures and claims.

BRIEF DESCRIPTION OF THE DRAWINGS

FIG. 2A shows a first state of the bi-stable spring surface and FIG. 2B shows a second state of the bi-stable spring surface.

FIG. 3A shows a first state of the bi-stable spring surface and FIG. 3B shows a second state of the bi-stable spring surface.

DETAILED DESCRIPTION OF CERTAIN EMBODIMENTS OF THE INVENTION

As used herein a "bi-stable spring surface" is a surface that is largely stable when in either of two states (state A and state B). State A and State B typically have different shapes. In general, state A is a relatively open, flat state, and state B is a coiled state. Each state can be considered "stable or "semi-stable" in that the state will remain the same when impacted by small forcings, nudgings or perturbations. When impacted by a sufficiently strong force or perturbation in a particular direction, the current state of the spring surface will switch to the other state (i.e., from state A to state B, or from state B to state A).

The present disclosure describes methods of mechanically latching UAV drone systems (hereinafter "drones" for brevity) to curved (e.g., round) surfaces, such as pipes, to facilitate inspection. A bi-stable spring surface acts as a latching mechanism so as to maintain contact of the drone to the curved surface. The bi-stable spring surface has a first, uncoiled state (state A) and a second, coiled state (state B) in which the spring surface conforms to a curved surface. Various mechanisms can be activated to switch or reverse the state of the bi-stable spring surface such as one or more motors. Conversely, in certain embodiments, the automatic switching of the bi-stable spring surface between states can be counteracted through the usage of motors as well. Sensors are coupled to the bi-stable surface to enhance the inspection capabilities of the drone and its related apparatus such as crawlers, etc. The modularity of the entire system allows it to be fully deployable as a stand-alone system or manually on the surface of interest.

Figures 1A, 1B:
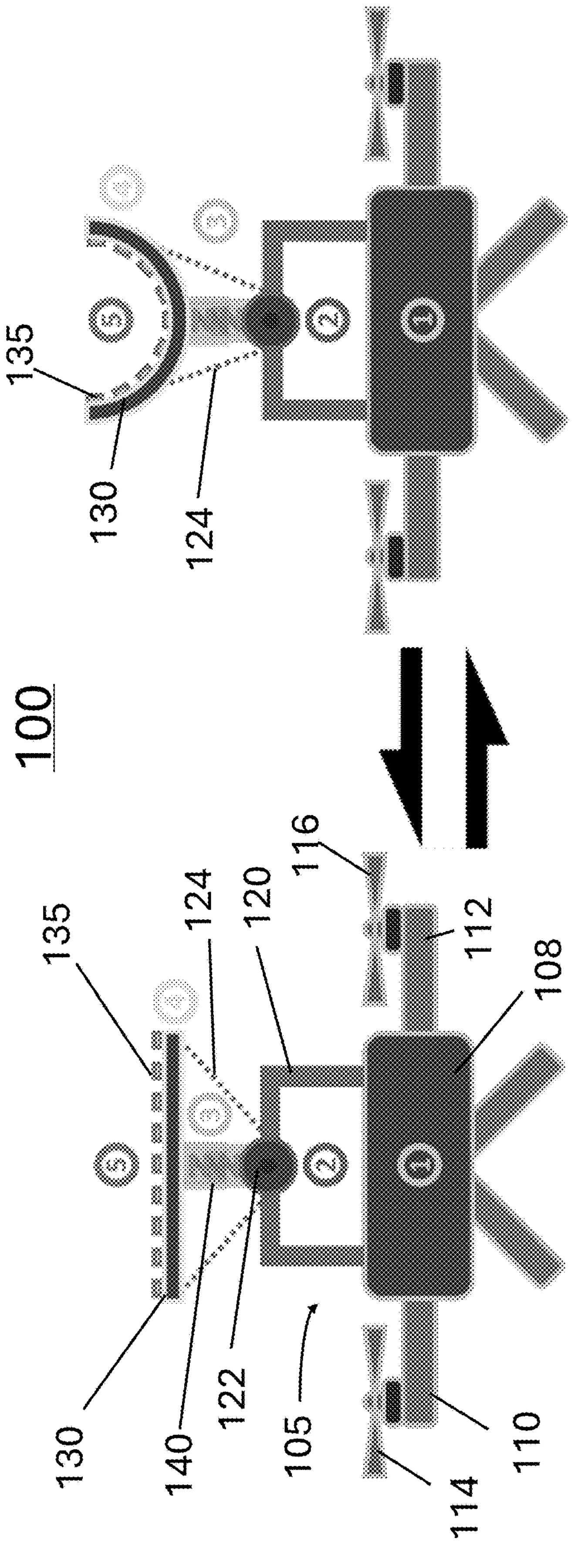
FIGS. 1A and 1B are schematic illustrations showing a magnetic covered bi-stable spring surface latch coupled to a drone in a first state (FIG. 1A) and a second state (FIG. 1B) according to an embodiment of the present disclosure.

FIGS. 1A and 1B are schematic illustrations showing the conversion of a drone system 100 in which a bi-stable spring surface having magnetic material is shown a first uncoiled state (FIG. 1A) to a second coiled state (FIG. 1B) according to an embodiment of the present disclosure. The drone system 100 includes drone 105 which can be an unmanned aerial vehicle of a multi-rotor design (as shown) having any number of rotors or a fixed wing design. In the embodiment depicted, drone 105 includes a chassis 108, propeller arms 110, 112 and respective propellers 114, 116. These are conventional components of drones as known in the art and are not described in detail. Coupled to the chassis 108 is a motorized activator which, in the depicted embodiment, comprises a fixture or bracket 120 and a rotary element 122 to which a cable 124 is affixed. Rotation of the rotary element 122 increases or reduces tension on the cable 124. Ends of the cable 124 are affixed to bi-stable spring surface 130 such that tensions or de-tensioning of the cable 124 is operative to toggle the bi-stable spring surface between coiled and uncoiled states. The bi-stable spring surface 130 has the properties defined above and can be made from a pre-stressed steel alloy, for example. Other materials such as copper and titanium can also be used. The length of the bi-stable spring surface is selected so as to correspond to the diameter/size of the object of interest to be able to fully wrap around it.

In FIG. 1A, bi-stable spring surface 130 is shown in an uncoiled state (state (A)). A spring-loaded connector 140 is positioned between the rotary element 122 and a center tap of the bi-stable spring surface 130. The spring-loaded connector 140 facilitates the coiling and wrapping of the bi-stable surface around a cylindrical surface. In the embodiment depicted in FIGS. 1A and 1B, the side of the bi-stable spring surface 130 that faces the object of interest (and away from the rest of the drone system 100) is referred to as the "inner" side. In the depicted embodiment the inner side of the bi-stable spring surface 130 is covered with magnetic material 135 in form of discrete or continuous magnetic elements. The magnetic material provides attraction to ferromagnetic surfaces such as the surfaces of steel pipes, tanks, etc. As described further below, sensor elements (e.g., ultrasonic, electromagnetic temperature, chemical, inertial, etc.) can also be incorporated in the inner side of the bi-stable spring surface to provide additional inspection capability.

As noted, FIG. 1A depicts the bi-stable spring surface 130 in state (A). In the depicted embodiment, tension on the cable 124 causes the ends of the spring surface to pull back into the uncoiled state. In contrast, in FIG. 1B, a loosening of cable 124 reduces the tension on the ends of the bi-stable spring surface 130 and allows it to toggle into coiled state (B) in which the bi-stable spring surface can conform to a round surface. This is due to the bias of the material from which the bi-stable spring surface is formed. The spring-coiled connector 140 further biases the spring surface to coil around the object of interest in state (B). Additionally or alternatively, the drone can be activation to apply force in the direction of the object of interest to urge the spring-coiled connector toward the center tap of the bi-stable spring surface, inducing it to coil. It is noted that in other embodiments, the surface can be biased toward state (A) in which case tension would be applied to maintain the surface in the coiled state.

Figures 2A, 2B:
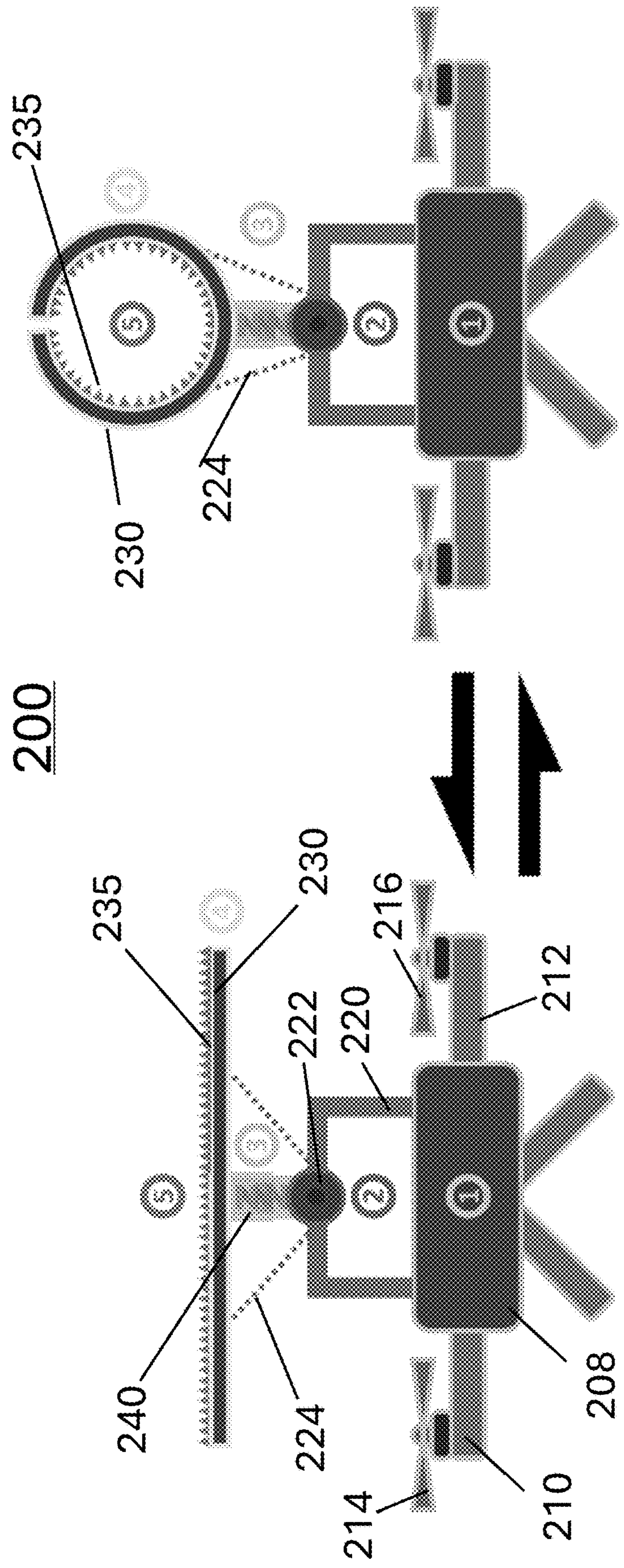
FIGS. 2A and 2B are schematic illustrations of another embodiment of a drone having a bi-stable spring surface latch covered with high-friction material.

FIGS. 2A and 2B depict another embodiment of a drone system 200 having a bi-stable spring surface latching mechanism. Similar to the embodiment shown in FIGS. 1A and 1B, drone 205 is implemented as a multi-rotor design and includes a chassis 208, propeller arms 210, 212 and respective propellers 214, 216. A motorized activator is coupled to the chassis 208 and comprises fixture 220, rotary element 222 and cable 224 affixed to the rotary element. Rotation of the rotary element 222 increases or reduces tension on the cable 224. Ends of the cable 224 are affixed to bi-stable spring surface 230. In FIG. 2A, bi-stable spring surface 230 is shown in a uncoiled state (state A). A spring-loaded connector 240 is positioned between the rotary element 222 and a center tap of the bi-stable spring surface 230. In the embodiment depicted in FIGS. 2A and 2B, the bi-stable spring surface 230 is coupled to and covered with a high friction top surface, instead of a magnetic surface. The high-friction surface can be formed of material such as, but not limited to, rubber, sandpaper, asbestos, carbon fiber, silicone and treated polymers. The high friction surface prevents slippage of the bi-stable surface in the coiled state. Similar to the embodiment of FIGS. 1A and 1B, the size of bi-stable spring surface 230 is selected to be in correspondence to the diameter/size of the object of interest to be able to fully wrap around it (as applies to all further embodiments discussed below). In FIG. 2B, a loosening of cable 224 reduces the tension on the ends of the bi-stable spring surface 230 and allows it to toggle into coiled state (B) in which the bi-stable spring surface can conform to a round surface. In the high-friction surface embodiment shown in FIGS. 2A and 2B it is preferable that the length of the bi-stable spring surface 230 be greater than half of the circumference of the surface of interest.

Figures 3A, 3B:
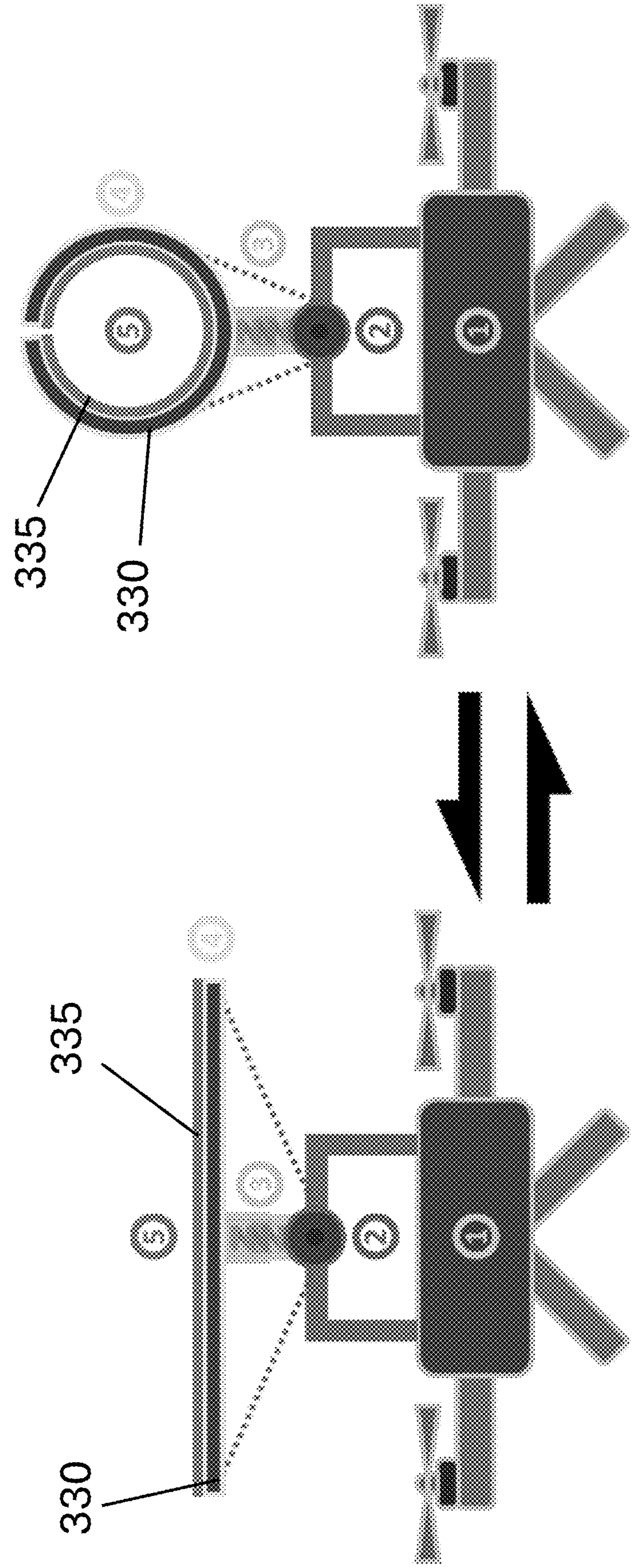
FIGS. 3A and 3B are schematic illustrations another embodiment of a drone having a bi-stable spring surface latch covered with high-adhesion material.

In another embodiment shown in FIGS. 3A and 3B, the bi-stable spring surface is coupled to and covered with high-adhesion materials in order to provide non-slip contact to the surface that it wraps around. It is again noted that the length of of the bi-stable spring surface is designed to correspond to the diameter/size of the object of interest to be able to fully wrap around it. All components of the embodiment shown in FIGS. 3A and 3B are the same as those shown in FIGS. 1A, 1B, 2A, and 2B except for the high-adhesion covering 335 positioned on the inner surface of bi-stable spring surface 330. The high-adhesion surface differs from the high-friction surface in terms of the materials employed. Example materials for the high-adhesion surface include, but are not limited to, epoxy adhesives. cyanoacrylate (superglue), polyurethane and butyl tape adhesives. These materials are selected for flexibility and strong adhesion.

Figures 4A, 4B, 4C, 4D:
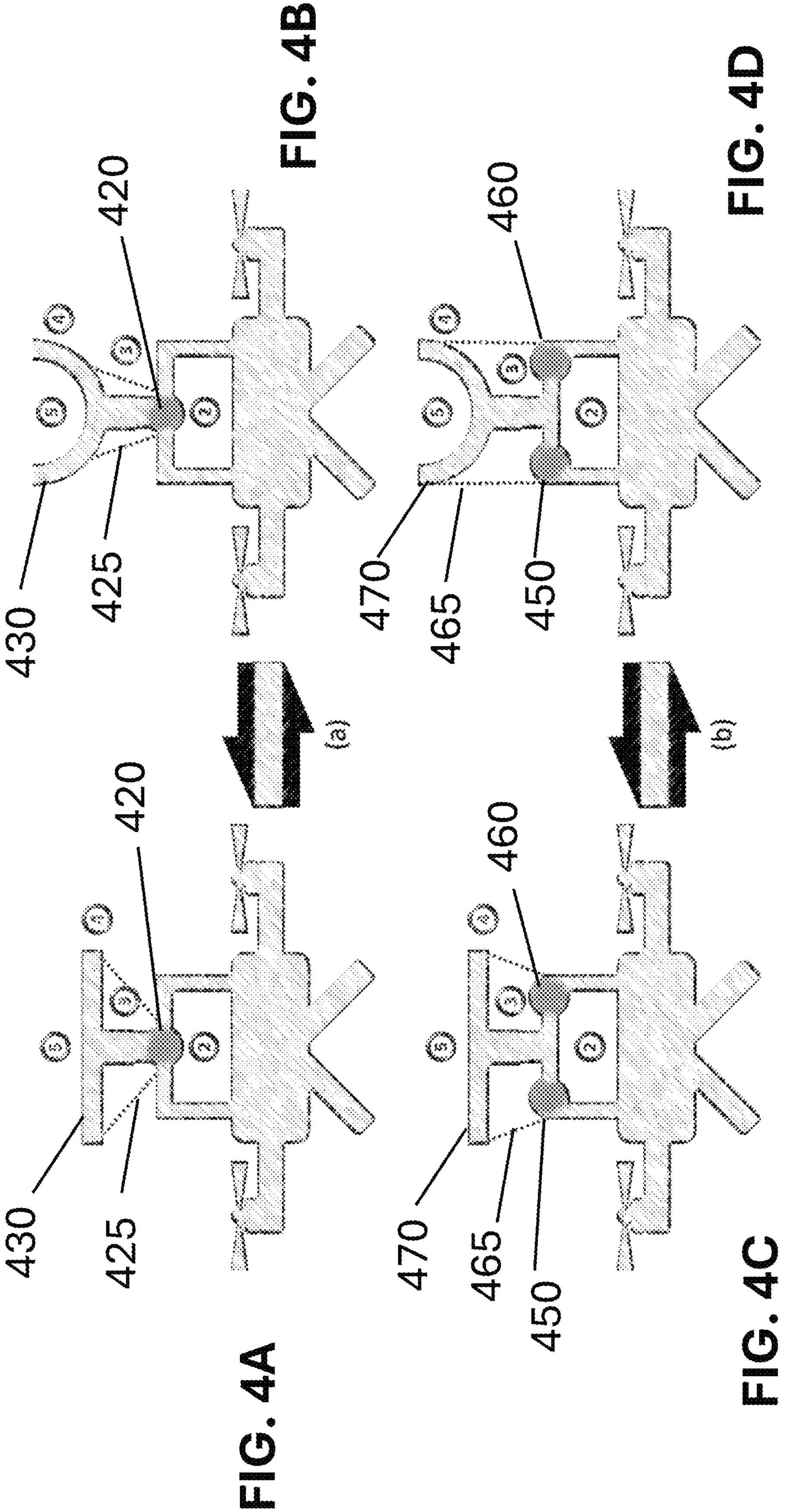
FIGS. 4A and 4B is a schematic view of a single motor embodiment of a drone system having a bi-stable spring surface for latching onto an object of interest according to an embodiment of the present disclosure.
FIGS. 4C and 4D is a schematic view of a dual motor embodiment of a drone system having a bi-stable spring surface for latching onto an object of interest according to an embodiment of the present disclosure.

All of the mentioned apparatus and methods of latching and wrapping around the object of interest employ one or more motorized mechanisms that are arranged to activate the transitional capability of the bi-stable spring surface from a rolled-up state (state B) of the bi-stable spring surface to a stretched-out state (state A). The motorized mechanism can be implemented using various configurations in terms of numbers and position with respect to the overall system. FIGS. 4A-4D show two example embodiments. FIGS. 4A and 4B show a single motor configuration similar to those shown in FIGS. 1A, 1B, 2A, 2B, 3A, and 3B. FIG. 4A shows a single motor 420 coupled to at two ends to a flexible thread or cable 425 in state (A) of the bi-stable spring surface 430. The single motor can be implemented as a DC, brushless DC, servo or any other motor type known in the art. In certain embodiments the two ends of thread/cable 425 are separately connected to a shaft of the motor 420. In state (A) the motor 420 applies tension, by rotation or other movement, to the bi-stable spring surface 430 to unravel the surface from a coiled state (B) shown in FIG. 4B. Accordingly, the latching of the bi-stable spring surface around an object of interest can be reversed through the usage of a single fixed motor. The two ends of the thread are fixed and connected to the shaft of the motor separately such that the rotation of the motor 420 in any direction (i.e. clockwise or counter-clockwise) results in the drag of the thread/cable 425 in both directions.

FIGS. 4C and 4D illustrate a dual motor embodiment. In this embodiment each motor 450, 460 is connected to one of the ends of the bi-stable spring surface 470 with a flexible versatile thread/cable 465 that transfers the rotation of the motors to a drag motion. The drag motion can flip the state of the surface to fully-stretched from a coiled state. Each end of the thread/cable 465 can be fixed and connected to the shaft of one of the motors 450, 460 separately. The motors 450, 460 can be any motor type (DC, Brushless DC, Servo, etc.). Motion of the motors 450, 460 in any direction (clockwise or counter-clockwise) results in drag of the thread/cable 465 and translation of mechanical force to the edge of the bi-stable spring surface 470 for state transition.

In each of the embodiments described herein, the bi-stable spring surface can be integrated with sensors. The sensors provide the capability for the entire structure to gather data concerning the surface it is wrapped around. In some implementations, sensors of any module/type can be evenly distributed along the bi-stable surface (e.g., between magnets or in slots/cavities positioned in the contact surface). FIGS. 5A-5F below illustrate bi-stable spring surfaces integrated with sensors in different configurations.

Figures 5A, 5B, 5C, 5D, 5E, 5F:
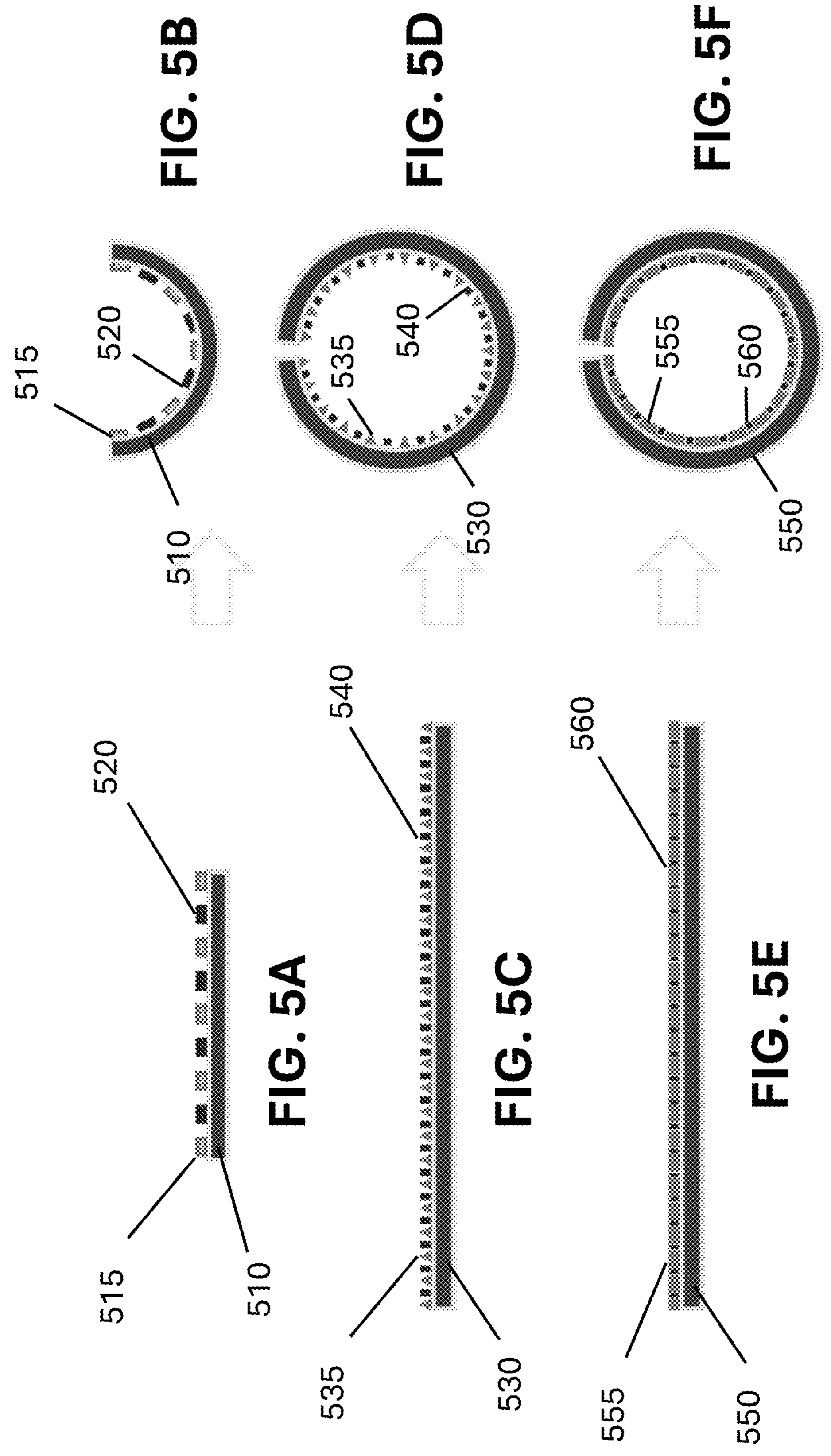
FIGS. 5A and 5B are schematic views of an embodiment of a bi-stable spring surface covered by contacting materials and sensor modules in both stretched (FIG. 5A) and coiled configurations (FIG. 5B) according to the present disclosure.
FIGS. 5C and 5D are schematic views of another embodiment of a bi-stable spring surface covered by contacting materials and sensor modules in both stretched (FIG. 5C) and coiled configurations (FIG. 5D) according to the present disclosure.
FIGS. 5E and 5F are schematic views of another embodiment of a bi-stable spring surface covered by contacting materials and sensor modules in both stretched (FIG. 5E) and coiled configurations (FIG. 5F) according to the present disclosure in which the contacting materials and sensors modules form a continuous surface.

FIGS. 5A an 5B show an embodiment of a bi-stable spring surface 510 covered by contacting materials 515 and sensor modules 520 in both stretched (FIG. 5A) and coiled configurations (FIG. 5B). In the embodiment shown in FIGS. 5A and 5B, the contacting materials are distributed evenly with spacing therebetween. The contacting materials can be magnetic, frictional or adhering materials as discussed above. The sensor modules 520 are positioned between the contacting materials. The sensor modules 520 in all embodiments can include ultrasonic, eddy current (electro-magnetic), temperature, chemical, inertial and/or any other suitable detector type. The sensor module 520 can be used to detect damage, leaks and corrosion in the object of interest, for example. In the embodiment shown in FIGS. 5A and 5B there is considerable spacing between the contacting materials and the sensor modules. While this reduces the surface area of the contacting materials and sensor modules it can reduce interference between the sensing modules and the contacting materials and can be particularly suitable for applications in which the accuracy and precision of sensor measurements is particularly desired.

FIGS. 5C and 5D show another embodiment of a bi-stable spring surface 530 covered by contacting materials 535 and sensor modules 540 in both stretched (FIG. 5C) and coiled configurations (FIG. 5D). In the embodiment shown in FIGS. 5C and 5D, the contacting materials 535 and sensor modules 540 are interspaced and positioned close together without being continuous. FIGS. 5E and 5F show a further embodiment of a bi-stable spring surface 550 covered by contacting materials 555 and sensor modules 560 in both stretched (FIG. 5E) and coiled configurations (FIG. 5F). In contrast to the other depicted embodiments, in the embodiment of FIGS. 5E and 5F, the interspaced contacting materials 555 and sensor modules 560 are directly adjacent and continuous, so that the inner surface of the bi-stable spring surface has no open spaces. This embodiment can be particularly suited for applications in which complete adherence to the object of interest is desired.

In all of the embodiments depicted in FIGS. 5A-5F the total number of sensor modules, and the distribution of both the contacting materials and sensor modules (e.g., uniform, varied) are selected according to the specific needs of the relevant application and object of interest.

Figure 6C:
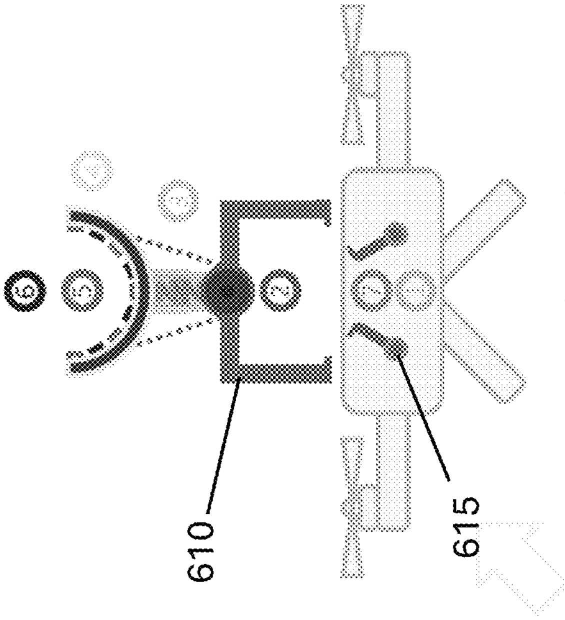
FIGS. 6A-6C are schematic views of a drone system that illustrate a method of releasing the bi-stable spring surface latch from a drone according to an embodiment of the present disclosure.
Figure 6B:
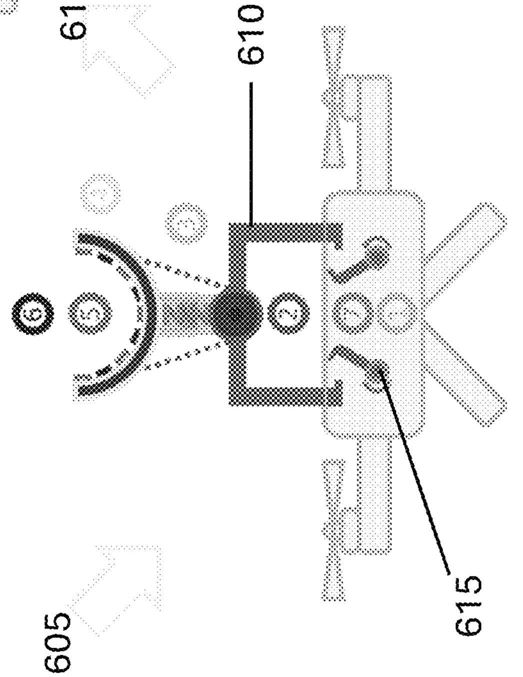
Figure 6A:
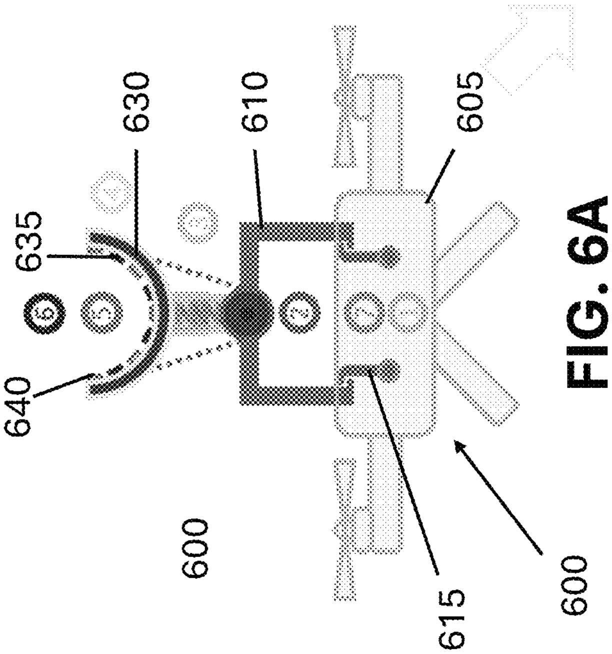

FIGS. 6A-6C illustrate a mechanism for releasing the bi-stable spring surface latch from a drone according to an embodiment of the present disclosure. In FIG. 6A a drone 600 with chassis 605 is coupled to a support fixture 610 which in turn is coupled to a motor 620, spring-loaded connector 625, a bi-stable spring surface 630 with contacting materials 635 and sensor modules 640. The bi-stable spring surface 630 is shown in a coiled configuration and wraps around an object of interest (not shown). The supporting fixture 610 is attached to the chassis 605 of the drone 600 by a releasable locking mechanism 615 that can be motor activated to unlock the supporting structure 610 from the drone chassis 605. In FIG. 6A, the support structure is in a locked position with respect to the drone chassis. In FIG. 6B, the locking mechanism 615 has been activated to release the supporting fixture 610 from the drone 600. In FIG. 6C the drone 600 is activated to move away from the supporting fixture and associated components, leaving the supporting fixture, motor 620 spring-loaded connector 625, and bi-stable spring surface 630 in position on the object of interest.

Figure 7B:
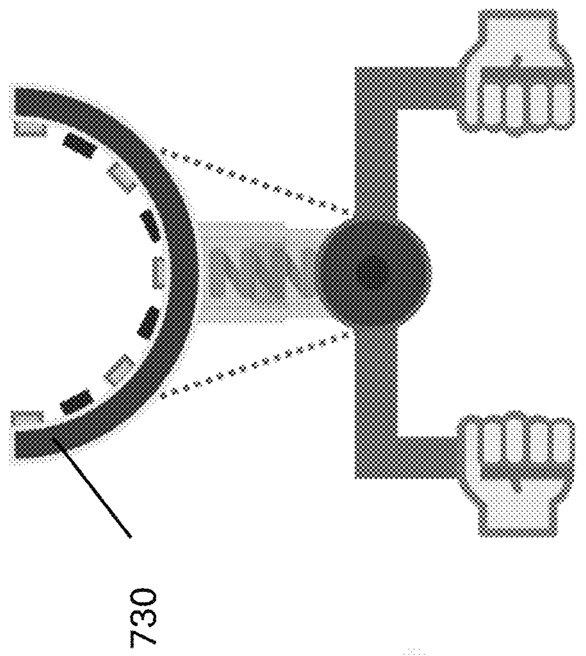
FIGS. 7A and 7B are schematic views of a drone system that illustrate a method of manually deploying a bi-stable spring surface on an object of interest according to an embodiment of the present disclosure.
Figure 7A:
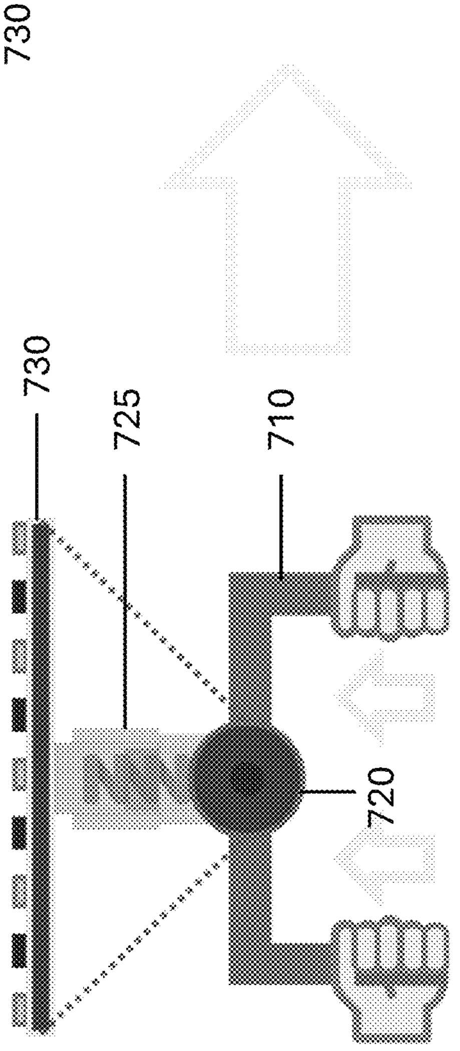

The bi-stable surface can also be deployed manually in certain instances. FIG. 7A illustrate such manual deployment. In FIG. 7A, in which bi-stable spring surface 730 starts in an uncoiled state, an operator pushes on the fixture 710 (having motor 720), which adds pressure to the spring-locked connector 725. The pressure on the spring-locked connector 725 is transferred to a center tap of a bi-stable spring surface 730. The pressure on the center-tap of the bi-stable spring surface 730 induces the spring surface to change the coiled state shown in FIG. 7B. It should be appreciated that the pressure can be applied to the center-tap of the bi-stable spring surface to cause the change to a coiled state in numerous other ways, including ground vehicles, pulleys, levers, etc.

The drone system with a bi-stable spring surface latch provides a great deal of flexibility since the size of the surface can be adjusted to the radius and size of the object of interest that is latched onto. The presence of sensor modules in the latch allows data to be continuously measured as long as the bi-stable spring surface is maintained on the object of interest. The sensor modules can include one or more wireless transceivers for communicating sensor data over a wireless network to a data repository for storage as is known in the art. The repository can be a local data and can be accessed through the cloud. Sensor modules will first send the raw data to the drone computer that will compile all data from all sensors, package them and compress them, then sends them to said data center.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for describing particular embodiments only and is not intended to be limiting of the invention. As used herein, the singular forms "a" "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes can be made and equivalents can be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for facilitating attachment of an unmanned aerial vehicle (UAV) to a curved surface of an object of interest comprising:

a bi-stable spring surface having two semi-stable states including a coiled state in which the bi-stable spring surface is able to conform to the curved surface and an uncoiled state, the bi-stable spring surface including sensor modules on an inner side that attach to the curved surface;

a fixture coupled on one side to the unmanned aerial vehicle and on another side to the bi-stable spring surface; and a motor coupled to the fixture and also coupled to the bi-stable spring surface via threads or cables, the motor being operative to apply tension to the bi-stable spring surface so as to induce a change in a state of the bi-stable spring surface which causes the bi-stable spring surface to either couple to or uncouple from the curved surface.

2. The apparatus of claim 1, wherein the motor is operative to apply tension to the bi-stable spring surface so as cause the bi-stable spring surface to change from a coiled to an uncoiled state.

3. The apparatus of claim 1, further comprising a spring-loaded connector positioned between the fixture and the bi-stable spring surface, wherein the spring-loaded connector is coupled to a center tap of the bi-stable spring surface and facilitates coiling of the bi-stable spring surface around the curved surface.

4. The apparatus of claim 1, wherein the inner side of the bi-stable spring surface is composed of a pre-stressed steel alloy.

5. The apparatus of claim 1, wherein the further comprising a releasable lock via which the fixture is coupled to the drone, wherein release of the lock detaches the drone from the fixture.

6. The apparatus of claim 1, wherein the sensor modules include one or more of ultrasonic, electro-magnetic, temperature, chemical, and inertial sensors.

7. The apparatus of claim 1, wherein the inner side of the bi-stable spring surface further includes contacting elements that facilitate adherence of the bi-stable spring surface to the curved surface.

8. The apparatus of claim 7, wherein the contacting elements include magnetic elements adapted to adhere to ferromagnetic surfaces.

9. The apparatus of claim 8, wherein the contacting elements and sensor modules are positioned adjacent to each other on the inner side of the bi-stable spring surface, with spacing between each contacting element and sensor module.

10. The apparatus of claim 8, wherein the contacting elements and sensor modules are positioned adjacent to each other on the inner side of the bi-stable spring surface such that they combine to create a continuous inner surface.

11. The apparatus of claim 7, wherein the contacting elements include elements adapted to adhere to the curved surface by means of friction.

12. The apparatus of claim 11, wherein a length of the bi-stable spring surface is constructed to be equal to or greater than half of a circumference of the object of interest.

13. The apparatus of claim 7, wherein the contacting elements include elements adapted to adhere to the curved surface by means of chemical adhesion.

14. The apparatus of claim 11, wherein a length of the bi-stable spring surface is constructed to be equal to or greater than half of a circumference of the object of interest.

* * * * *